United States Patent Office 3,134,358
Patented May 26, 1964

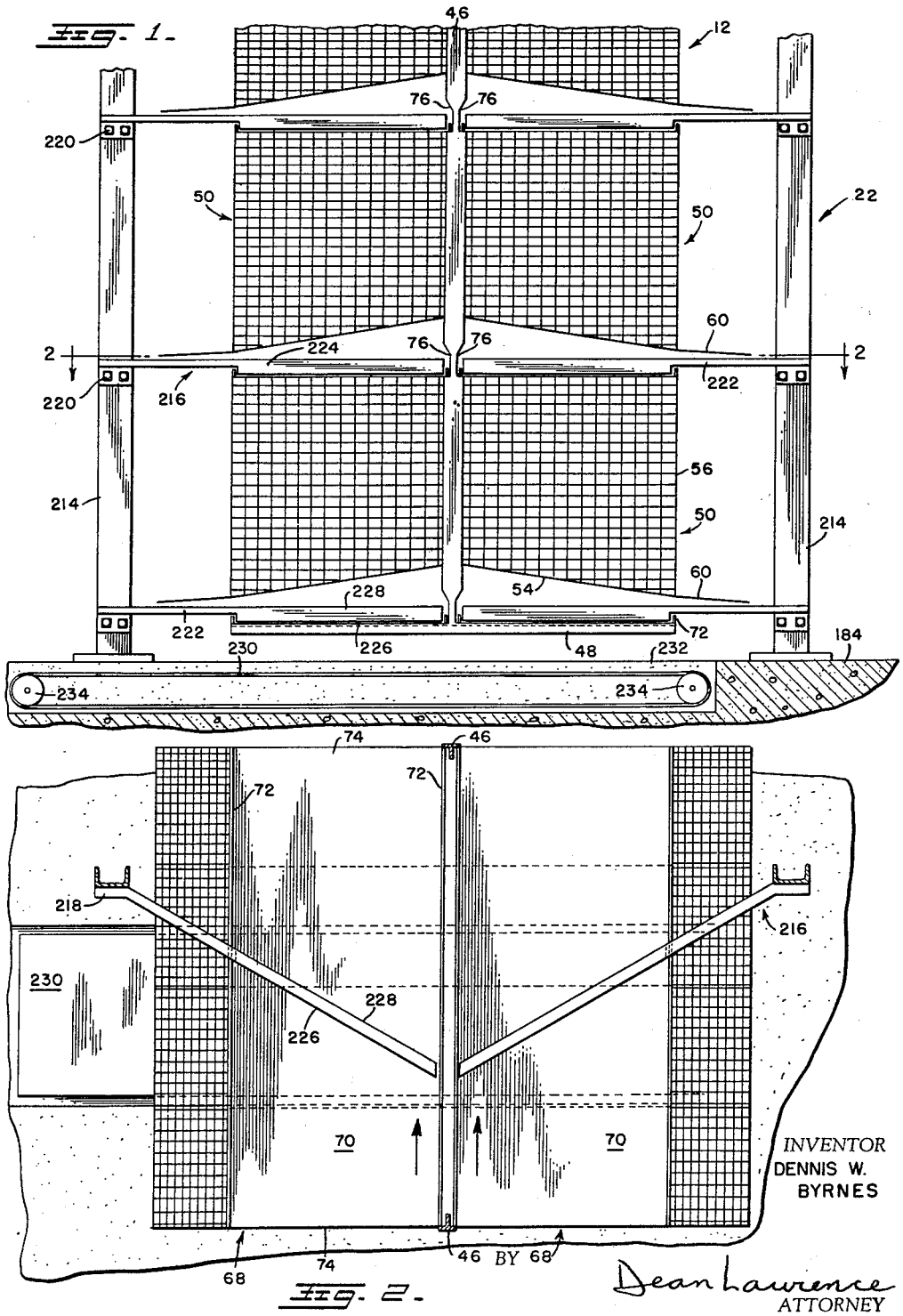

3,134,358
MANURE REMOVER
Dennis W. Byrnes, 4565 S. 6th St., Tucson, Ariz.
Original application Jan. 30, 1958, Ser. No. 712,118, now Patent No. 3,045,612, dated July 24, 1962. Divided and this application Sept. 27, 1961, Ser. No. 146,678
4 Claims. (Cl. 119—22)

The present invention relates to animal husbandry, and more particularly relates to apparatus and process for the husbandry of small animals. More particularly this invention relates to an apparatus for removing manure from animal cages. This application is a division of copending application Serial Number 712,118, filed January 30, 1958, and now United States Patent 3,045,612 dated July 24, 1962.

The growing and processing of small animals is a tremendous industry. In the United States, consumption of whole chickens including fryers and broilers requires that huge facilities be devoted to the breeding and raising of chickens to meet the demand of the market for the whole birds. In addition, the fresh egg industry has reached gigantic proportions. It can be estimated that there are over 300 million laying hens in the United States at the present time. The market demand for whole turkeys has grown tremendously and has great peaks for Thanksgiving and Christmas. Thus the significance of the small animal industry, and of improvements leading to greater efficiency in that industry, is readily apparent.

The present invention resides in the concept of an animal husbandry system comprising means for conveying a plurality of animal cage assemblies in an endless path and including means for removing deposited manure from the cage assemblies.

An object of the invention is to provide an animal cage assembly for rotatable suspension from a conveyor and including a plurality of vertically-spaced groups of cages with foraminous bottoms extending outwardly from a central vertical support and manure trays beneath and spaced from each cage group constructed so that stationary scrapers may remove the manure from the manure trays as the cage assemblies are moved past the scrapers.

Further objects and advantages of the invention will be apparent upon reference to the following specification and drawings, wherein:

FIGURE 1 is a vertical sectional view illustrating a stacked poultry cage assembly and including stationary manure scrapers disposed between the spaced cages forming the assembly.

FIGURE 2 is a horizontal sectional view taken along the lines 2—2 in FIGURE 1.

The animal husbandry apparatus and system illustrated in the drawing is adapted for laying hens such as chicken hens. The apparatus includes a plurality of horizontally-spaced cage assemblies 12 each rotatably suspended from and driven by an endless conveyor. A manure removal station 22 is located adjacent the endless path of movement of the cage assemblies.

To form a support for the groups of cages, a pair of vertical central support members 46 extend downwardly from the middle of bars 42. As seen in FIGURE 1, a cage bottom 48 is secured to the lower ends of central support bars 46. A plurality of vertically spaced cage groups 50 are secured to bars 46 and extend outwardly therefrom with spaces 52 between vertically-spaced cage groups 50. Each cage group 50 can include a plurality of horizontally-adjacent cages. The cages are formed of wire mesh sides, ends, and bottoms. The mesh of the bottoms 54 is chosen of the proper fineness so that the manure droppings of the hens passes through the mesh.

In order to collect the manure dropped through the bottom 54 of each cage group 50, a manure tray 68 is positioned beneath and spaced from each cage group 50. Each manure tray 68 includes a flat bottom 70, upstanding edges 72 at both sides of the tray, and open ends 74. Two manure trays 68 rest in cage assembly bottom 48. Manure trays are mounted on top of cage groups 50 and form the tops thereof, except for the uppermost cage groups 50 which have sheet metal tops. The central support bars 46 are cut away adjacent the manure trays at 76 to permit complete removal of manure from the trays.

The manure removal station 22 includes a pair of vertical posts 214 rigidly mounted on floor 184 and extending upwardly therefrom. Manure scrapers generally indicated by the numeral 216 have mounting plates 218 secured by bolts 220 to the posts 214. Manure scrapers 216 have arm portions 222 extending diagonally forwardly or upstream in the direction of the oncoming cage assemblies 12. Attached to the arm portions 222 are manure scraper blades 224 having their heights inclined to the vertical so that the lower edges 226 of the blades located forwardly or upstream from the upper edges 228 with respect to the path of movement of the cage assemblies 12. The lower edges 226 of the manure scraper blades are positioned to closely engage and scrape the bottoms 70 of the manure trays 68.

To receive and carry away the manure scraped from the many manure trays, a horizontal conveyor 230 is mounted in an aperture 232 in floor 184 and driven by drive wheels 234 driven by conventional power drive means (not shown).

The invention may be embodied in other specific forms without departing from the spirit or essential characteristics thereof. The present embodiments are therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an animal husbandry device in which a plurality of vertically spaced cages for housing animals attached to and extending from a central vertical support in a side-by-side relationship, said central vertical support having adjacent vertically spaced indentations on opposite sides thereof, and said cages are carried on an endless conveyor, each of said cages having a wire screen bottom permitting animal manure to fall therethrough, and a flat bottom manure pan supported under and spaced from the screen bottom of each cage into one of said indentations and thereby extending beyond the inner edge of the bottom of the cage thereabove, a manure removing apparatus comprising: a plurality of vertically spaced and horizontally extending manure scraper blades angularly disposed in the path of said vertically spaced cages, each scraper blade adapted to be received in the manure pan of each cage, said scraper blades closely engaging the bottoms of said manure pans and into said indentations to scrape the manure from said cages as said cages move relative to the scraper blades whereby the manure is simultaneously and completely removed from all of said vertically spaced cages; and conveyor means below said cages for receiving and removing said manure scraped from said manure pans.

2. Apparatus for animal husbandry comprising: a movable animal cage assembly including a central vertical support having vertically spaced indentations in the opposite sides thereof, and a plurality of vertically spaced cages secured to opposite sides of said central vertical support, said cages being arranged in a side-by-side relationship and extending perpendicularly from said central vertical support; a flat manure tray attached to the top of each cage and extending completely under the bottom of the cage thereabove and into an indentation in said central vertical support; vertical stationary posts disposed on either side of said cage assembly; vertically spaced scrapers attached to said posts and extending horizontally therefrom between said vertically spaced cages and into said indentations in said central vertical support whereby manure in each of said manure trays is removed by said scrapers when said cage assembly is moved relative to and between said stationary posts.

3. Apparatus for animal husbandry as set forth in claim 2 wherein each said scraper has its length extending in a direction inclined to a perpendicular to the path of movement with its inner end positioned at a point displaced forwardly or upstream from said post with respect to the path of movement of said cage assemblies; and each said scraper has its height inclined to a vertical plane with its lower edge located forwardly or upstream from its upper edge with respect to the path of movement of said cage assemblies.

4. Apparatus for animal husbandry as set forth in claim 2 including a conveyor having a portion thereof located beneath said scrapers and extending to a point spaced from said path of movement of said cages; whereby manure scraped from said manure trays will fall upon said conveyor and be conveyed from said path of movement.

References Cited in the file of this patent
UNITED STATES PATENTS

| | | |
|---|---|---|
| 2,257,734 | Cornell | Oct. 7, 1941 |
| 2,314,344 | Cornell | Mar. 23, 1943 |
| 2,383,326 | Lovell | Aug. 21, 1945 |

FOREIGN PATENTS

| | | |
|---|---|---|
| 643,416 | Great Britain | Sept. 20, 1950 |